Patented Jan. 3, 1928.

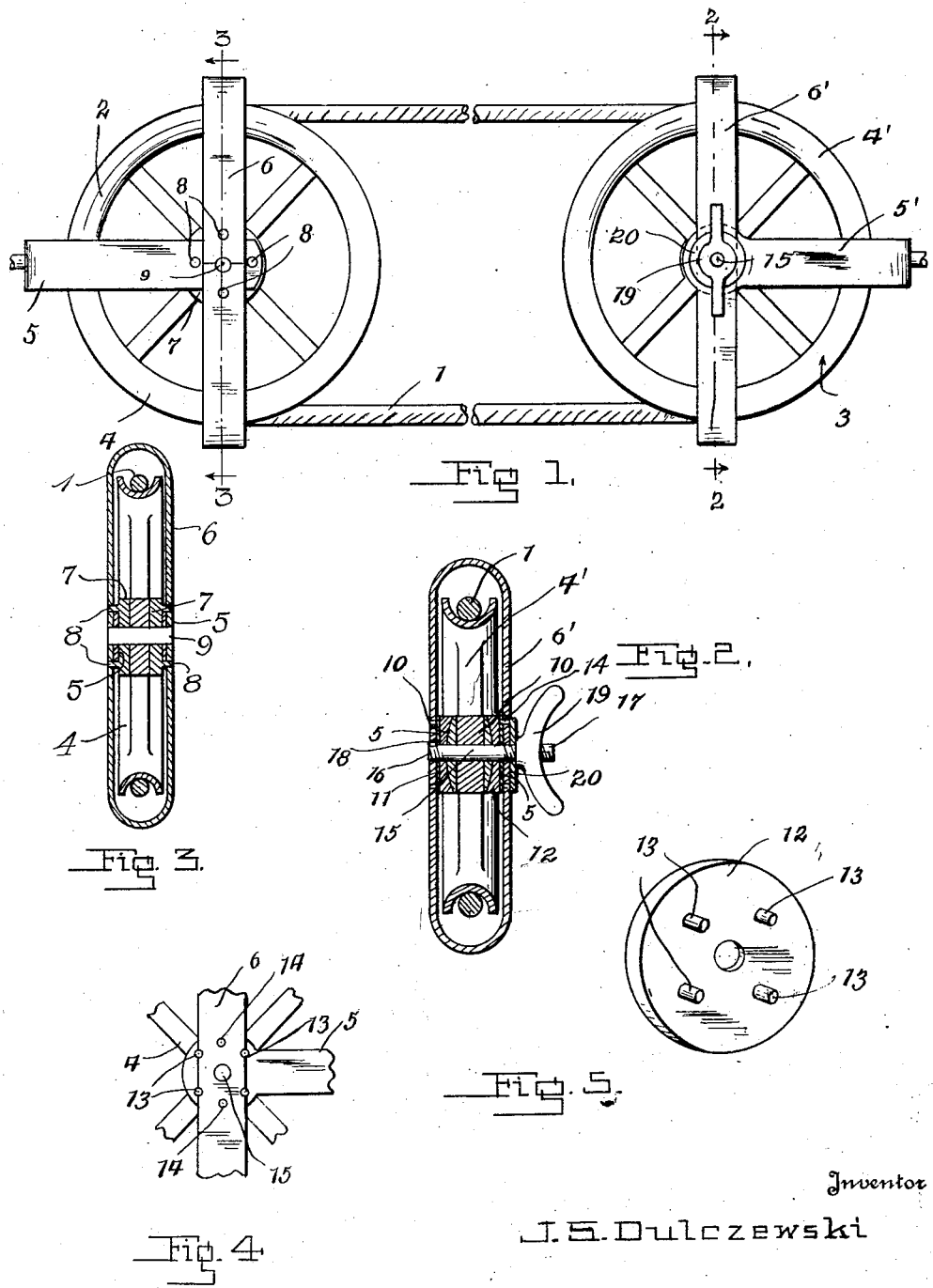

1,654,682

UNITED STATES PATENT OFFICE.

JOHN S. DULCZEWSKI, OF AMSTERDAM, NEW YORK.

CLOTHESLINE PULLEY.

Application filed September 13, 1926. Serial No. 135,253.

This invention relates to clothes lines and more particularly to a pulley adapted to be engaged by an endless clothes line, one flight of which is to be moved away from the pulley as clothes are attached to it.

One object of the invention is to provide a pulley having a wheel adapted to be held stationary and prevented from rotating after clothes have been attached to a line engaged with the pulley.

Another object of the invention is to permit the pulley wheel to be very securely locked against rotation but permitted to be easily released when necessary.
Another object of the invention is to provide the pulley with clutches of a simple construction and very easy to operate.

The invention is illustrated in the accompanying drawing, wherein Figure 1 is a view in side elevation showing a clothes line engaged with pulleys of the improved construction;

Fig. 2 is a vertical sectional view taken on the line 2—2 of Fig. 1;
Fig. 3 is a similar view taken on the line 3—3 of Fig. 1;

Fig. 4 is a view showing a fragment of the improved pulley in side elevation, and Fig. 5 is a perspective view of a clutch member forming a part of the pulley.

The clothes line, which is shown in side elevation in Fig. 1, includes an endless line 1 which may be formed of rope or wire and is engaged with the pulley wheels of the two pulleys 2 and 3. The pulley 2 includes a pulley wheel 4 disposed in an open frame preferably formed of sheet metal and including a yoke 5 which straddles the pulley wheel and has the free end portions of its arms extending in crossed relation to an elongated band 6 disposed diametrically of the wheel in encircling relation thereto. An abutment disk 7 is disposed at each side of the hub of the pulley wheel 4, and these disks are secured to the arms of the yoke 5 and adjacent portions of the band 6 by rivets 8 which may be formed integral with the disks or separate therefrom. An axle 9 extends through the hub of the pulley wheel and has its end portions passed through alined openings formed in the disks and opposite side portions of the frame and secured therein in any desired manner. It will thus be seen that the pulley wheel will be disposed between abutment disks which will serve to properly center it between the arms of the yoke.

The pulley wheel 3 has the hub of its pulley 4' provided with side extensions 10 which are preferably disks applied while casting the pulley and are formed of a metal which does not wear easily. Clutch disks 11 and 12 are disposed at opposite sides of the pulley and each is formed with a concaved inner surface which conforms to the contour of the convexed outer face of the adjacent disk 10 so that the hub portion of the pulley may be firmly gripped between the two clutch members when pressure is applied as will be hereinafter brought out. Each of the clutch members carries a number of pins 13 which project from its outer side face and are spaced from each other circumferentially of the disk. These pins project through openings formed in the overlapped portions of the yoke 5' and band 6' and assist the rivets 14 to retain the band and arms of the yoke in proper crossed relation to each other. The pins of the clutch disk 11 are rigidly secured in the opening through which they pass so that this clutch will be rigidly secured to the pulley frame but the pins projecting from the clutch disk 12 are loose in the openings through which they pass so that this clutch will be permitted to have movement between the pulley wheel and frame while at the same time be held against rotary movement. An axle 15 extends through the hub of the pulley wheel and has one end portion 16 threaded and screwed into alined threaded openings formed in the adjacent side of the pulley frame and its other end portion 17 threaded and projected through alined unthreaded openings in the other side portion of the pulley frame. A key 18 is applied to the threaded end portion 16 of the axle to hold it against rotation and prevent the axle from working loose. In order to move the clutches into tight gripping engagement with the hub of the pulley wheel, there has been provided a wing nut 19 which is screwed upon the projected end portion 17 of the axle and a pressure disk 20 which fits loosely upon the axle between the nut 19 and adjacent side of the pulley frame. The pressure disk is disposed in covering relation to the projected ends of the pins 13 carried by the clutch disk 12 and since the sheet metal strips from which the pulley frame is formed are resilient it will be readily seen that, when the wing nut is tightened to move the disk 20 into engagement with the ends of the pins, pressure will be applied to the clutch disk 12 and a pulling action exerted upon the clutch 11 through the medium of the axle or the clutch 12 and pulley wheel both forced towards the clutch disk 11. This will cause the concaved inner faces of the clutch disks to engage the convexed side faces of the disks 10 rigidly carried by the hub of the pulley wheel and the pulley wheel will be very firmly locked and prevented from rotating until the securing nut is loosened.

When the clothes line is in use, the pulleys are suspended from suitable supports, the pulley 3 being preferably mounted close to a window or doorway where a person hanging clothes upon the line is to stand. The clothes line is engaged with the pulleys either before or after they are mounted and when the securing nut 19 is loosened the line may be freely moved as the clothes are pinned to it. After the clothes have been attached to the line, the nut is tightened and pressure will be applied to the disk to cause the hub of the pulley wheel 4' to be firmly gripped and prevent rotation of the pulley wheel. Since the pulley wheel is securely locked, the line will not move freely and the clothes hung upon the line will be retained in the desired position between the pulleys. When it is desired to remove the clothes from the line, the nut is loosened and the line may then be easily moved as the clothes are removed from it. It will be obvious that a conventional pulley could be substituted for the pulley 2 as the pulley wheel of this pulley is not to be locked.

Having thus described the invention, I claim:

1. A pulley comprising a frame having spaced sides, a pulley wheel in said frame, an axle for said pulley wheel extending through its hub and having one end secured to a side of the frame and its other end portion slidably passed through the other side of the frame and projecting therefrom, clutch disks surrounding said axle within the frame and at opposite sides of said pulley wheel, one being loose from said frame and provided with pins projecting outwardly through openings in the adjacent side of the frame in circumferentially spaced relation, a pressure disk loosely mounted upon the projected end portion of the axle to engage the outer ends of said pins, and a nut screwed upon the projected end of said axle and adapted to engage said pressure disk to force the same towards the frame and apply inward pressure to said pins to cause the hub of the pulley wheel to be gripped between the clutch disks.

2. A pulley comprising a frame having side portions formed with alined openings, a pulley wheel in said frame, an axle for said wheel having one end portion secured in the opening in one side portion of said frame and its other end portion slidably passing though the opening in the other side of the frame and projecting from the frame, friction clutches about said axle at opposite sides of said pulley wheel, one being rigidly secured to the adjacent side of said frame and the other provided with pins slidably passed through openings in the other side of the frame and projecting from the frame, a pressure disk loose upon the projected end portion of said axle, and means carried by the projected end portion of said axle to bear against said pressure disk and move the same into engagement with the pins to force the pin carrying clutch and wheel towards the opposite side of the frame and effect gripping of the wheel between the clutches.

In testimony whereof I affix my signature.

JOHN S. DULCZEWSKI. [L. S.]